DAVID COPELAND, Jr.
Improvement in Cement Pipe Molds.

No. 115,029.                               Patented May 23, 1871.

Witnesses:

Inventor:
D. Copeland, Jr.
By W. S. Loughborough & Co
Att'ys 115,029

UNITED STATES PATENT OFFICE.

DAVID COPELAND, JR., OF ROCHESTER, NEW YORK.

IMPROVEMENT IN CEMENT-PIPE MOLDS.

Specification forming part of Letters Patent No. 115,029, dated May 23, 1871.

I, DAVID COPELAND, Jr., of Rochester, in the county of Monroe and State of New York, have invented certain Improvements in "Molds for Cement Pipe," of which the following is a specification:

My invention relates to a novel method of forming the branch connections upon lengths of drain-pipes; and consists more particularly in the employment of a loose section of core in connection with a suitable recess in the mold-case.

Figure 1:
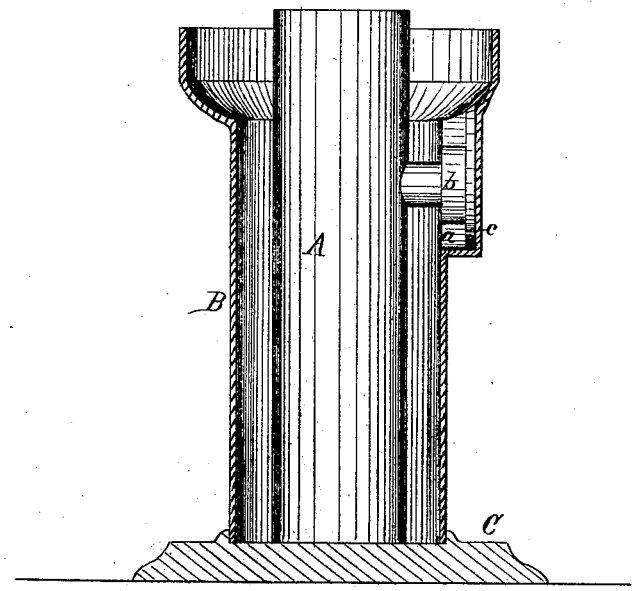
Figure 2:
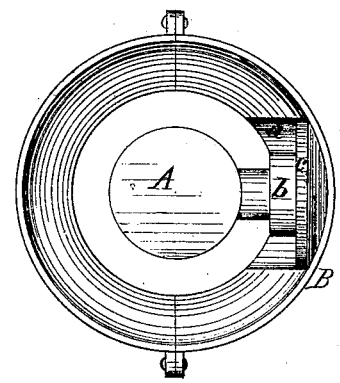

In the drawing, Figure 1 is a vertical central section of my invention. Fig. 2 is a plan view.

In the usual construction of molds for forming branches upon sewer or drain pipes that portion of the core used in the branch is keyed or bolted to the main core before the material is introduced, a cap being placed over the opening in the mold-case, which is likewise keyed or bolted to the latter. The case necessarily divides through the center of the branch, and a special mold is thus required for the "branch lengths" of each size of pipe. This plan is expensive both as regards the number of molds required and the amount of fitting upon each one; and, moreover, the branch core is a serious hindrance to the workman in tamping the cement around it from the upper end of the mold.

In my improved mold a recess, $a$, is formed in the case B near the collar portion, as shown, the recess communicating with the collar-socket in the mold. The branch core $b$ is made separate from the main core A, and is constructed of suitable size and shape to form the requisite passage to the interior of the pipe and the recess or socket for the connection. A flange, $c$, is provided upon the outer end of this branch core, the width of which permits it to slide easily into the recess $a$ from the upper end of the case B, and the inner end of the core is concaved to fit the curvature of the main core, as indicated in Fig. 2. The bottom of the recess $a$ is semi-cylindrical, and the flange $c$ fits into it closely so as to prevent the passage of cement at any place around it in the process of tamping. The flange $c$ is thus a guide for the introduction of the branch core to the mold, and also a stop to regulate its adjustment in the recess $a$, while it fills a portion of the mold where no material is wanted. The case B parts at right angles to the line of the branch, as indicated in Fig. 2, whereby the change in form, necessitated by the addition of the branch, is confined to one-half of the case, leaving the other half plain, and permitting its use in connection with other parts of molds for making ordinary lengths of pipe. This plan results in a large saving of mold-cases in the factory.

By locating the branch near the joint-collar and shortening the projecting boss, as is required by my construction, I effect a considerable saving in the material at this point.

In the practical use of my invention the case B is placed upon the base or platform C, to which the main core A is fixed, the case being retained concentric to the latter by a suitable flange or stops upon the platform. The cement is then introduced at the top and tamped in till the mold is filled up nearly or quite to the recess $a$. The branch core $b$ is now pushed down into the recess, being held in position by the flange $c$ and main core A, and the filling of the mold completed.

After the cement is sufficiently set the halves of the case are removed, exposing the flanged end of the core $b$, which may then be drawn out laterally, leaving a passage to the center of the main and a recess for the connection, as set forth.

It will be observed that, by means of the detached section of core $b$ introduced at the end of the mold, the latter may be nearly filled before the core is placed in position, and thus the operations of the workman in the tamping material are not interfered with.

What I claim as my invention is—

1. The mold-case B when provided with the recess $a$, the main core A, and the branch core $b$, all constructed and combined together, substantially as and for the purposes set forth.

2. In combination with the detached branch core $b$ and socket $a$ in the mold-case, the guiding-stop $c$, operating substantially as set forth.

D. COPELAND, JUN.

Witnesses:
D. L. JOHNSTON,
F. H. CLEMENT.